United States Patent
Machiyama

(10) Patent No.: US 8,533,813 B2
(45) Date of Patent: Sep. 10, 2013

(54) IMAGE PROCESSING APPARATUS AND IMAGE PROCESSING SYSTEM

(75) Inventor: Kenichi Machiyama, Minato-ku (JP)

(73) Assignee: Oki Data Corporation, Tokyo (JP)

( * ) Notice: Subject to any disclaimer, the term of this patent is extended or adjusted under 35 U.S.C. 154(b) by 904 days.

(21) Appl. No.: 12/361,890

(22) Filed: Jan. 29, 2009

(65) Prior Publication Data

US 2009/0193517 A1    Jul. 30, 2009

(30) Foreign Application Priority Data

Jan. 30, 2008  (JP) .................................. 2008-019798

(51) Int. Cl.
G06F 12/00   (2006.01)
G06F 12/14   (2006.01)

(52) U.S. Cl.
USPC ................. 726/18; 726/20; 713/172; 713/175

(58) Field of Classification Search
USPC .......................................................... 726/18
See application file for complete search history.

(56) References Cited

U.S. PATENT DOCUMENTS

| | | | | |
|---|---|---|---|---|
| 7,771,133 | B2 * | 8/2010 | Oomura et al. ................. | 400/62 |
| 7,954,149 | B2 * | 5/2011 | Shimoda ......................... | 726/20 |
| 8,027,054 | B2 * | 9/2011 | Kang et al. ..................... | 358/1.16 |
| 8,032,705 | B2 * | 10/2011 | Klitsner et al. ................. | 711/115 |
| 8,279,580 | B2 * | 10/2012 | Zhong et al. ................... | 361/502 |
| 2001/0052994 | A1 * | 12/2001 | Murata ........................... | 358/1.15 |
| 2004/0039911 | A1 * | 2/2004 | Oka et al. ....................... | 713/175 |
| 2005/0141043 | A1 * | 6/2005 | Nakazawa ..................... | 358/444 |
| 2005/0181729 | A1 * | 8/2005 | Ibrahim et al. ................ | 455/41.2 |
| 2005/0190399 | A1 * | 9/2005 | Nakaoka et al. .............. | 358/1.15 |
| 2006/0085524 | A1 * | 4/2006 | Lee ................................. | 709/220 |
| 2006/0181729 | A1 * | 8/2006 | Kuribara ........................ | 358/1.14 |
| 2006/0209337 | A1 * | 9/2006 | Atobe et al. ................... | 358/1.15 |
| 2007/0086580 | A1 * | 4/2007 | Wakazono .................. | 379/88.17 |
| 2007/0255918 | A1 * | 11/2007 | Suzuki ........................... | 711/163 |
| 2008/0181650 | A1 * | 7/2008 | Matsui ............................. | 399/80 |
| 2008/0201773 | A1 * | 8/2008 | Hattori ........................... | 726/18 |
| 2008/0252940 | A1 * | 10/2008 | Koizumi ........................ | 358/474 |
| 2008/0307522 | A1 * | 12/2008 | Shoji et al. ...................... | 726/21 |
| 2009/0150596 | A1 * | 6/2009 | Cheng ........................... | 711/103 |

FOREIGN PATENT DOCUMENTS

| | | |
|---|---|---|
| JP | 8084212 A | 3/1996 |
| JP | 8125875 A | 5/1996 |
| JP | 2002-010025 A | 1/2002 |
| JP | 2005080233 A | 3/2005 |
| JP | 2006228101 A | 8/2006 |
| JP | 2007066123 A | 3/2007 |
| JP | 2007150873 A | 6/2007 |
| JP | 2007328765 A | 12/2007 |

* cited by examiner

*Primary Examiner* — Kambiz Zand
*Assistant Examiner* — Yonas Bayou
(74) *Attorney, Agent, or Firm* — Panitch Schwarze Belisario & Nadel LLP

(57) ABSTRACT

An image processing apparatus capable of managing easily secret information even with detachably attaching an external memorizing device, includes an ID (plug and play ID) retrieving unit for retrieving ID from the connected memory, a user information storing unit for storing user information, an active memory information storing unit for storing the retrieved ID with corresponding to the respective users, a memory use judging unit for judging as to whether the memory is usable based on the ID retrieved from the connected memory and on the ID stored in the active memory information storing unit, and a data writing controlling unit for writing data to the memory judged as usable.

11 Claims, 14 Drawing Sheets

FIG. 3

REGISTER USER ID AND PASSWORD

USER ID    :  ab012345

PASSWORD   :  ****

SET USE LIMITATION TO FUNCTIONS

COPY       :  ACTIVE    INACTIVE

SCAN       :  ACTIVE    INACTIVE

FACSIMILE  :  ACTIVE    INACTIVE

CONNECT YOUR USB MEMORY

THE USB MEMORY WILL BE REGISTERED

IF YOU DO NOT REGISTER ANY USE MEMORY,

PLEASE PUSH THE STOP BUTTON.

FIG. 9

| FIELDNAME | SIZE(BYTE) | DESCRIPTION |
|---|---|---|
| bLength | 1 | DESCRIPTION'S SIZE(0x12 FIXED) |
| bDescriptor | 1 | DESCRIPTION'S TYPE(0x01 FIXED) |
| bcdUSB | 2 | USB SPECIFICATION RELEASING NUMBER OF BCD EXPRESSION |
| bDeviceClass | 1 | CLASS CODE<br>0:NO CLASS<br>0xFF:VENDER<br>1~0xFE:SPECIFIC |
| bDeviceSubClass | 1 | SUB CLASS CODE |
| bDeviceProtocol | 1 | PROTOCOL CODE<br>0:NO USE OF SPECIFIC PROTOCOL<br>0xFF:SPECIFIC |
| bMaxPacketSize0 | 1 | MAXIMUM PACKET SIZE OF END POINT 0 |
| idVendor | 2 | VENDER ID(ASSIGNED BY USB IF) |
| idProduct | 2 | PRODUCT ID(ASSIGNED BY VENDER) |
| bcdDevice | 2 | DEVICE SPECIFIC ID OF BCD EXPRESSION |
| iManufacturer | 1 | RELEASE NUMBER OF DEVICE REPRESENTING MANUFACTURER |
| iProduct | 1 | INDEX TO STRING DESCRIPTOR REPRESENTING THE PRODUCT |
| iSerialNumber | 1 | INDEX TO STRING DESCRIPTOR REPRESENTING DEVICE MANUFACTURE NUMBER |
| bNumConfigurations | 1 | POSSIBLE NUMBER OF STRUCTURES |

IMAGE PROCESSING APPARATUS AND IMAGE PROCESSING SYSTEM

BACKGROUND OF THE INVENTION

1. Field of the Invention

This invention relates to an image processing apparatus detachably attaching an external memorizing device and to an image processing system having such an image processing apparatus.

2. Description of Related Art

An art has been proposed in which a recording medium detachably attached to a scanner body is connected to directly write to the recording medium the image data obtained through reading an original document (see, e.g., Japanese Unexamined Patent Publication No. 2002-10025). In such a prior art, a scanner is disclosed in which a memorizing medium such as a memory card or a magneto-optical recording medium is directly connected to a scanner body to write the read image data into the recording medium. With this art, this scanner can execute reading operation without connecting to any information processing apparatus such as a personal computer.

Not only scanners as described above, but also image processing apparatuses such as, e.g., multi-function peripherals, or MFPs allowing the external memorizing device including a memorizing medium to be detachably attached, are widely used these days. With such image processing apparatuses, any user can advantageously save the electronic data easily in the external memorizing device, but there raises a problem from a view to information management because secret information stored in the image processing apparatus can be easily taken out.

It is therefore an object to provide an image processing apparatus capable of easily managing secret information even though allowing an external memorizing device to be detachably attached, and also to provide an image processing system having such an image processing apparatus.

SUMMARY OF THE INVENTION

According to the invention, foregoing objects are accomplished with an image processing apparatus to which an external memorizing device for making data writable thereto is detachably attached, the image processing apparatus comprising: a connection unit for connecting the external memorizing device in which specific memorizing device identification information is stored; an identification information retrieving unit for retrieving the memorizing device identification information from the external memorizing device connected to the connection unit; a user information storing unit for storing user information relating to a user; a memorizing device usage allowance information storing unit for beforehand storing, in a manner corresponding to the user information, the memorizing device identification information retrieved by the identification information retrieving unit; a memorizing device usage judgment unit for judging as to whether the external memorizing device is used, based on the memorizing device identification information retrieved out of the external memorizing device by the identification information retrieving unit and on the memorizing device identification information stored in the memorizing device usage allowance information storing unit corresponding to the user information beforehand, where the external memorizing device is connected to the connection unit; and a data writing controlling unit for writing data to the external memorizing device where the memorizing device usage judgment unit judges as that the external memorizing device connected to the connection unit is usable.

In another aspect of the invention, an image processing system has an external memorizing device for making data writable thereto and an image processing apparatus detachably attaching the external memory device. The external memorizing device includes: an identification information storing unit for storing specific memorizing device identification information; and a data storing unit for storing data received from the image processing apparatus. The image processing apparatus includes: a connection unit for connecting the external memorizing device; an identification information retrieving unit for retrieving the memorizing device identification information from the external memorizing device connected to the connection unit; a user information storing unit for storing user information relating to a user; a memorizing device usage allowance information storing unit for beforehand storing, in a manner corresponding to the user information, the memorizing device identification information retrieved by the identification information retrieving unit; a memorizing device usage judgment unit for judging as to whether the external memorizing device is used, based on the memorizing device identification information retrieved out of the external memorizing device by the identification information retrieving unit and on the memorizing device identification information stored in the memorizing device usage allowance information storing unit corresponding to the user information beforehand, where the external memorizing device is connected to the connection unit; and a data writing controlling unit for writing data to the external memorizing device where the memorizing device usage judgment unit judges as that the external memorizing device connected to the connection unit is usable.

With the image processing apparatus and the image processing system, the memorizing device usage allowance information storing unit stores the user information and the memorizing device identification information of the external memorizing device usable by the user corresponding to the user information, and where the external memorizing device is connected to the connection unit, a judgment is made as to whether the external memorizing device is usable based on the memorizing device identification information retrieved from the external memorizing device and the memorizing information identification information stored in the memorizing device usage allowance information storing unit, and the image processing apparatus restricts data writing to the external memorizing device. That is, with the image processing apparatus and the image processing system according to the invention, the user can limit the usable external memorizing device.

According to the invention, because the user can limit usable external memorizing device, the management of the secret information can be performed easily upon creating a situation that the secret information cannot be taken out freely, so that information management can surely be made.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein:

FIG. 3 is a memory table illustrating examples of user information stored in a user information storing unit incorporated in the multifunction peripheral shown in FIG. 1 and active memory information stored in an active memory information storing unit;

FIG. 5 is a diagram showing a screen of user information registration displayed on a displaying unit arranged at the multifunction peripheral shown in FIG. 1;

FIG. 6 is a diagram showing a screen of function use limitation information setting displayed on a displaying unit arranged at the multifunction peripheral shown in FIG. 1;

FIG. 7 is a diagram showing a screen of USB memory registration displayed on a displaying unit arranged at the multifunction peripheral shown in FIG. 1;

FIG. 9 is a diagram showing a data structure of a device scripter stored in the USB memory;

DESCRIPTION OF THE PREFERRED EMBODIMENTS

In the following embodiments, a multifunction peripheral serving as an image processing apparatus having multiple image processing functions such as copying function, facsimile function, and scanner function, and an image processing system having such a multifunction peripheral are described. The multifunction peripheral particularly can detachably attach a USB (Universal Serial Bus) memory as an external memorizing device; a user can limit a usable USB memory or USB memories; and each user can limit usable functions.

First Embodiment

Figure 1:
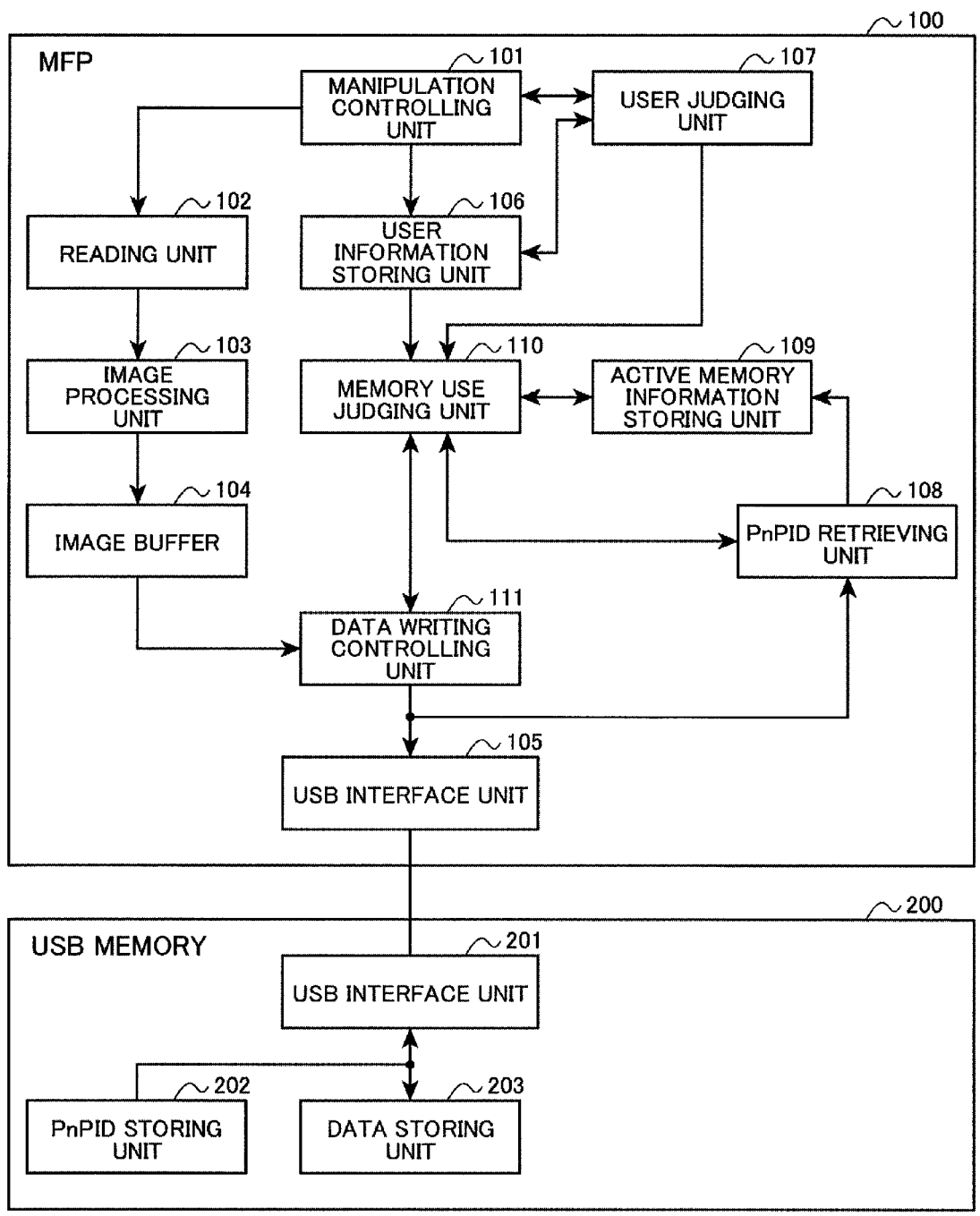
FIG. 1 is a block diagram illustrating a structure of an image processing apparatus according to a first embodiment of the invention.

As shown in FIG. 1, the multifunction peripheral 100 has: a manipulation controlling unit 101 serving as a controller for receiving user's manipulations and performing various controls according to the manipulations and as a user information entry unit; a reading unit for reading original documents; an image processing unit 103 for processing image data read with the reading unit 102; an image buffer 104 for temporarily storing image data processed by the image processing unit 103; a USB interface unit 105 serving as a connection unit for making communications with a USB memory 200 connected to the multifunction peripheral 100; a user information storing unit 106 for storing a variety of information regarding the user; a user judging unit 107 for judging functions usable by the login user; a plug and play ID or PnPID retrieving unit 108 serving as an identification information retrieving unit for retrieving "plug and play ID (referred to as "PnPID") of the USB memory 200 connected to the multifunction peripheral 100; an active memory information storing unit 109 as memorizing device usage allowance information storing unit for storing active memory information showing activeness with respect to each user on the USB memory 200 connected to the multifunction peripheral 100; a memory use judging unit 110 serving as a memorizing device use judging unit for judging as to whether data writing usage is allowed with respect to the USB memory 200 connected to the multifunction peripheral 100; and a data writing controlling unit 111 for controlling writing of image data to the USB memory 200.

Figure 2:
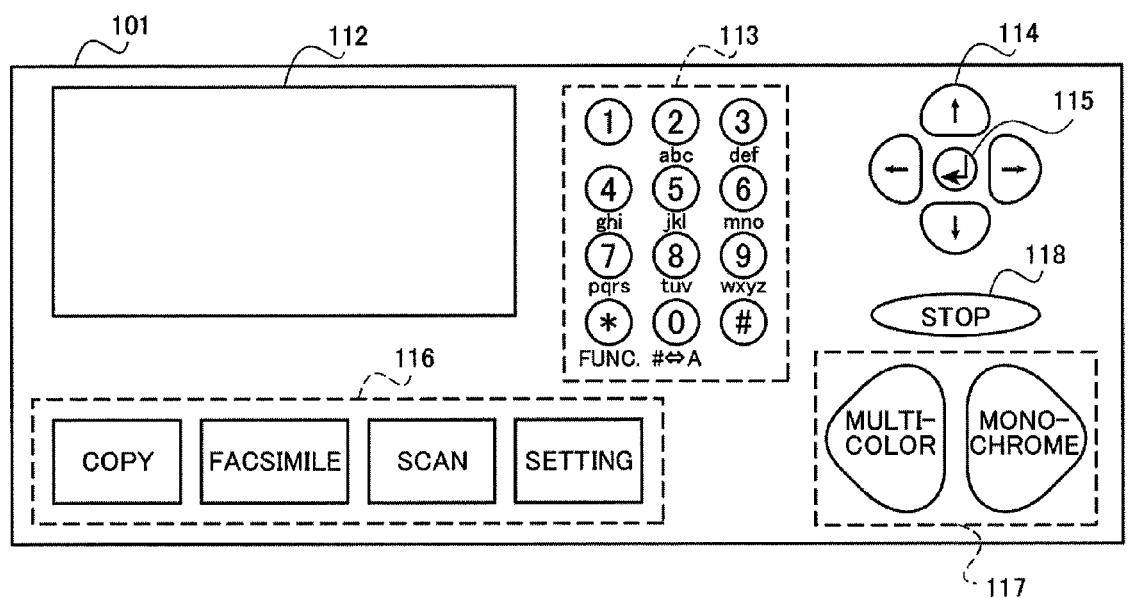
FIG. 2 is a front view showing a structure of a manipulation controlling unit incorporated in a multifunction peripheral shown in FIG. 1.

The manipulation controlling unit 101 receives entire manipulations in which a user makes entry of manipulations to the multifunction peripheral 100, and performs various controls according to the manipulations. More specifically, the manipulation controlling unit 101, as shown in, e.g., FIG. 2, includes a displaying unit 112 for displaying such as setting items and status information of the multifunction peripheral 100, a ten key 113 for entering letters and numbers, a cursor key 114 for moving a cursor displayed on the displaying unit 112 during, e.g., manipulations for various settings, an enter key 115 for entering items indicated by the cursor displayed on the displaying unit 1112 and for entering inputted contents, a plurality of mode switching buttons 116 for switching operation modes of the multifunction peripheral 100, a start button 117 for beginning executions of respective functions owned by the multifunction peripheral 100, and a stop button 118 for stopping processing in operation.

The manipulation controlling unit 101 thus structured displays a prescribed scanner function screen on the displaying unit 112 when receiving manipulation for designating reading original documents, such as, e.g., in a case that a user pushed down a scanning button among the mode switching buttons 116. Necessary information such as resolution is entered with the ten keys 113 to the manipulation controlling unit 101, and the manipulation controlling unit 101 controls the reading unit 102 to make reading operation of the original documents according to pushing down manipulation of the start button 117. The manipulation controlling unit 101 displays a prescribed setting screen at the displaying unit 112 in a case where the user pushes down the setting button among the mode switching buttons 116. The manipulation controlling unit 101 here displays a prescribed registration screen at the displaying unit 112 in a case where an item indicating registration manipulation of the user information is selected among the setting items displayed at the setting screen and where the enter key is pushed down. The manipulation controlling unit 101 stores the entered user information in the user information storing unit 106 according to the pushing down manipulation of the enter key 115 where the user information is inputted using the ten keys or the like. With those operations, the user information is surely registered in the multifunction peripheral 100. The manipulation controlling unit 101 displays a prescribed login screen 112 at the displaying unit 112 in a case where an item indicating a login manipulation is selected among the setting items displayed on the setting screen according to the manipulation of the cursor key 14 and where the enter key is pushed down. The manipulation controlling unit 101 supplies the received login information to the user judging unit 107 upon inputting the login information in use of the ten keys 113 and pushing down the enter key 115, thereby rendering the user judge the functions usable for the user.

The reading unit 102 reads original documents set to an original document setting table of a flat bed scanner type not shown and an automatic document feeder or ADF with a prescribed resolution to produce electronic image data. The reading unit 102 supplies the produced image data to the image processing unit 103.

The image processing unit 103 performs various image processings on the image data read and produced with the reading unit 102. The image processing unit 103, for example, performs image processing to convert image data read with the reading unit 102 into data in a format writable in the USB memory 200. The image processing unit 103 temporarily stores in the image buffer 104 the processed image data.

The image buffer 104 is made of, e.g., random access memories, and memorizes temporarily image data produced through image processing with the image processing unit 103. It is to be noted that the image buffer 104 is for temporarily storing image data and enough with volatile memories. The image data stored in the image buffer 104 are read out with the data reading controlling unit 111.

The USB interface unit 105 is constituted of ports detachably attaching the USB memory 200 and makes communications with the USB memory 200 connected to the multifunction peripheral 100. More specifically, the USB interface unit 105 transmits the image data to the USB memory 200 upon supplied with image data stored in the image buffer 104 via the data writing controlling unit 111. The USB interface unit 105 receives PnPID in the USB memory 200 connected to the multifunction peripheral 100 according to a request of the PnPID retrieving unit 108 and supplies the received PnPID to the PnPID retrieving unit 108.

The user information storing unit 106 is made of non-volatile memories such as, e.g., flash memories and EEPROM (Electronically Erasable and Programmable Read Only Memory) and stores user information supplied from the manipulation controlling unit 101. It is to be noted that the user information includes, as shown in, e.g., an upper table in FIG. 3, user number assigned sequentially to each user who is registered as a user using the multifunction peripheral 100, and user ID and password for distinguishing respective users, and further includes usage limitation information on respective functions that the user can use among functions given to the multifunction peripheral 100. In the upper table in FIG. 3, the items for copy, scanner, and facsimile are usage limitation information; an item having its flag of "1" indicates that the function is usable; an item having its flag of "0" indicates that the function is not usable. For example, in the upper stage in FIG. 3, a user registered with the user number "0001" is indicated as he can use the copying function and the scanner function but cannot use the facsimile function. The user information stored in the user information storing unit 107 thus formed are read out with the user judging unit 107 and the memory use judging unit 110.

The user judging unit 107 judges authority of login operation for each user based on the login information supplied from the manipulation controlling unit 101 and the user information read out of the user information storing unit 106, and also judges functions usable by the user among the functions given to the multifunction peripheral 100. The user judging unit 107 supplies user judgment information indicating the judgment result to the memory use judging unit 110.

The PnPID retrieving unit 108 retrieves PnPID of the USB memory 200 via the USB interface unit 105 at a time when the USB memory 200 is connected to the multifunction peripheral 100. The PnPID is described as follows. The plug and play devices have to store identification information assigned individually to distinct each device as one particular set in order to read in appropriate driver software upon recognition of the connecting host apparatus as one particular set. The identification information is PnPID. The PnPID is assigned to each device by the manufacturer of the device, and is stored in the device hardware. More specifically, the PnPID is constituted of a vender ID made of two bites, a product ID made of two bites, and a device specific ID made of two bites that can be set from 0x0000 to 0xFFFF. The vender ID is identification information indicating the device manufacturer. The product ID and the device specific ID are identification information assigned to individual product models by the device manufacturer, and the same product ID or the same device specific ID cannot be assigned to other product models made by the same device manufacturer. Accordingly, in the lower table in FIG. 3, in a case of PnPID corresponding to the user number "0000", the vender ID is hexadecimal number information of "ABCD"; the product ID is hexadecimal number information of "1111"; the device specific ID is hexadecimal number information of "00FF". The PnPID retrieving unit 108 retrieves such a PnPID according to connection of the USB memory 200 to the multifunction peripheral 100 and supplies the retrieved PnPID to the memory use judging unit 110. The PnPID retrieving unit 108 retrieves the PnPID from a new USB memory 200 and renders the active memory information storing unit 109 store the retrieved PnPID in a case when the USB memory 200 is newly registered.

The active memory information storing unit 109 is made of non-volatile memories such as e.g., flash memories or EEPROMs, and stores active memory information indicating activeness with respect to users on the USB memory 200 connected to the multifunction peripheral 100. More specifically, the active memory information is, as shown in the lower table in FIG. 3, information corresponding the user number to the PnPID of the USB memory unable by the user corresponding to the user number. It is to be noted that in the lower table in FIG. 3, the word "NULL" set forth in the item of the PnPID indicates a status that the USB memory is not registered. That is, in the lower table in FIG. 3, the USB memory that the user registered at the user number "0001" can use is not registered yet. The active memory information stored in the active memory information storing unit 109 thus formed is read out with the memory use judging unit 110.

The memory use judging unit 110 reads out the user information corresponding to the user who made login, based on the user judgment information supplied from the user judging unit 107, and reads out the active memory information corresponding to the user number contained in the read-out user information from the active memory information storing unit 109. More specifically, the memory use judging unit 110, as shown in FIG. 3, links the user information read out of the user information storing unit 106 with the active memory information read out of the active memory information storing unit 109 using the user number as a key, thereby reading out the active memory information corresponding to the login user from the active memory information storing unit 109. The memory use judging unit 110 compares the PnPID of the read-out active memory information with the PnPID of the USB memory 200 connected to the multifunction peripheral 100 supplied from the PnPID retrieving unit 108, and judges as to whether writing use of the data is allowed for the USB memory 200 based on the judgment result. The memory use judging unit 110 supplies the memory use judgment information showing the judgment result to the data writing controlling unit 111.

The data writing controlling unit 111 controls writing of the image data to the USB memory 200 based on the memory use judgment information supplied from the memory use judging unit 110. More specifically, the data writing controlling unit 111 transfers image data read out of the image buffer 104 to the USB interface unit 105 in a case where the memory use judgment information supplied from the memory use judging unit 110 includes contents allowing writing use of the data, thereby writing the data in the USB memory 200. On the other hand, the data writing controlling unit 111 controls not to read out the image data from the image buffer 104 in a case where the memory use judgment information supplied from the memory use judging unit 110 includes contents not allowing writing use of the data.

The multifunction peripheral 100 thus structured makes registrations of the connectable USB memories 200 with respect to the users, also makes registrations of usable functions with respect to the users, and makes writings of the image data to the USB memory 200 where it is judged as that the use is matching with the registered contents.

To the contrary, the USB memory 200 connected to the multifunction peripheral 100 thus formed includes, as shown in FIG. 1, a USB interface unit 201 for communications with the multifunction peripheral 100, a PnPID storing unit 202 serving as identification information storing unit storing PnPID of the USB memory 200, and a data storing unit 203 for storing image data.

The USB interface unit 201 is structured of such as a plug detachably attached to the USB interface unit 105 of the multifunction peripheral 100 to be connected, and communicates with the multifunction peripheral 100. More specifically, the USB interface unit 201 reads out the own PnPID stored in the PnPID storing unit 202 where the multifunction peripheral 200 to be connected provides a retrieving request on the PnPID, and transmits the PnPID to the multifunction peripheral 100. The USB interface unit 201 receives the image data transmitted from the multifunction peripheral 100 and stores the received image data in the data storing unit 203.

The PnPID storing unit 202 is made of non-volatile memories such as, e.g., flash memories or EEPROMs and stores the PnPID of the USB memory 200. The PnPID stored in the PnPID storing unit 202 is read out by the USB interface unit 201 when the multifunction peripheral 100 to be connected makes a retrieving request.

The data storing unit 203 is made of non-volatile memories such as, e.g., flash memories or EEPROMs and constitutes a main memorizing unit of the USB memory 200. More specifically, the data storing unit 203 stores image data received from the multifunction peripheral 100 via the USB interface unit 201.

The USB memory 200 thus formed is connected to the multifunction peripheral 100 upon registration to the multifunction peripheral 100 with respect to the usable users and is utilized as a saving location of the image data.

Figure 4:
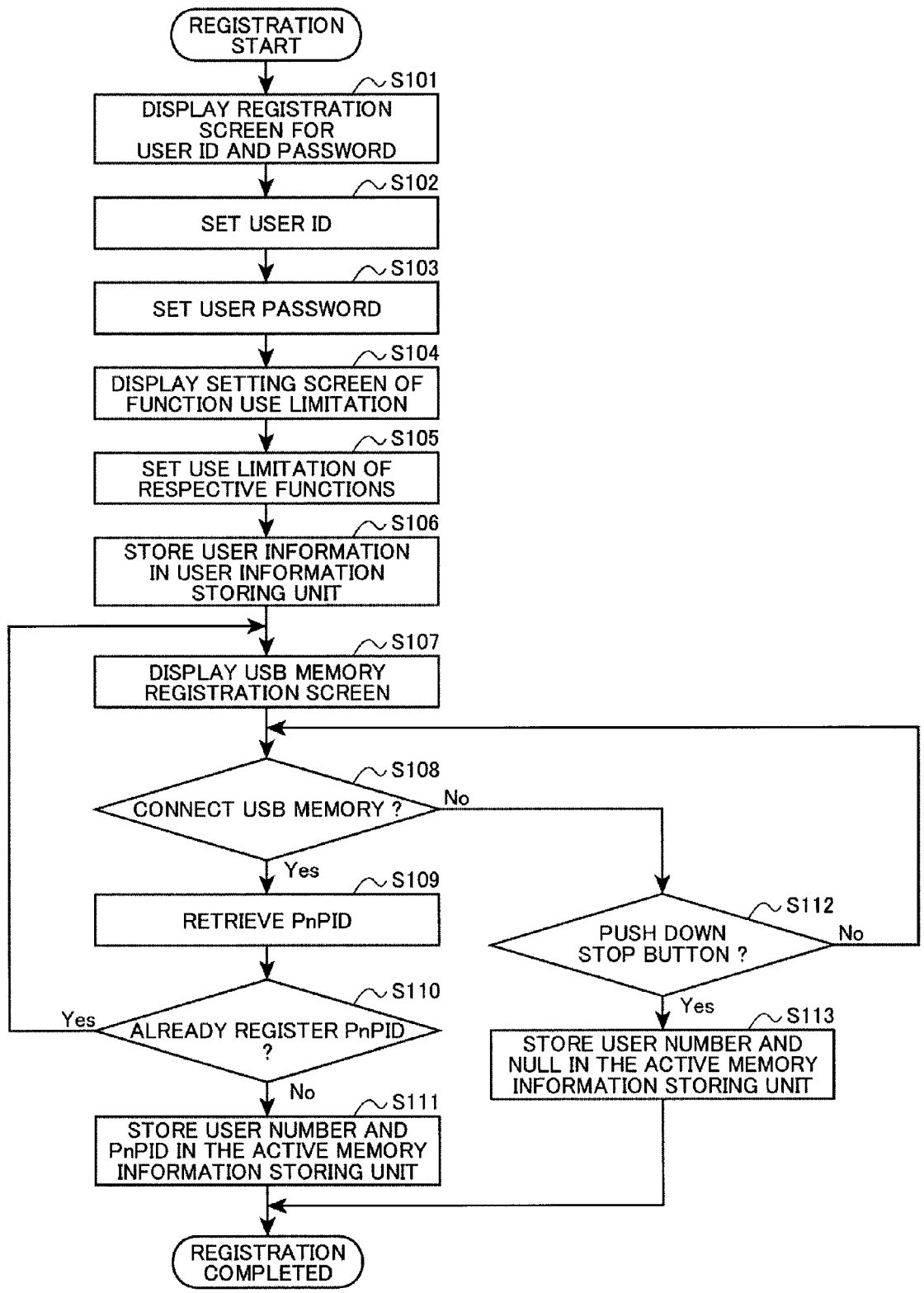
FIG. 4 is a flowchart illustrating a series of recording processings when user information and connectable USB memory are recorded in the multifunction peripheral in the image processing system according to the first embodiment of the invention.

In the multifunction peripheral 100 to which such a USB memory 200 is connectable, it is required to make registrations of the user information and the connectable USB memories 200 beforehand. More specifically, the multifunction peripheral 100 executes a series of processings as shown in FIG. 4 as this registration processing. It is to be noted that the following description is for a case in which an apparatus manager of the multifunction peripheral 100 makes a registration of the user information and the USB memory and in which he allows the USB memory 200 registered at the multifunction peripheral 100 to be used by respective users upon providing the USB memory 200.

In the multifunction peripheral 100, the registration manipulation of the user information and the USB memory 200 is done by the manipulation controlling unit 101. The manipulation controlling unit 101 first of all displays a prescribed user information registration screen at the displaying unit 112 at step S101 as shown in FIG. 4. The user information registration screen is constituted to allow the user ID and the user password to enter as shown in, e.g., FIG. 5. With the manipulation controlling unit 101, the apparatus manager enters the user ID and the user password using the ten keys 113 (see FIG. 2) or the like in entry boxes of the user information registration screen thus formed, and accepts the entered user ID and user password to be set at steps S102 and S103 according to pushing down of the enter key 115. In FIG. 5, a situation in which a user having the user ID of "ab012345" makes a registration of the user ID and user password is shown.

The manipulation controlling unit 101 subsequently displays a prescribed function usage limitation information setting screen on the displaying unit 112 at step S104. The function usage limitation information setting screen is structured, as shown in, e.g., FIG. 6, to be capable of setting as to whether the usage of respective functions given to the multifunction peripheral 100 is active or inactive. With the manipulation controlling unit 101, the apparatus manager selectively designates either active or inactive operation using the cursor keys 114 or the like on the function usage limitation information setting screen thus formed, and sets allowance or not allowance of usage of the respective functions at step S105 according to pushing down of the enter key 115. In FIG. 6, a situation that the copying function, the facsimile function, and the scanner function given to the multifunction peripheral 100 are made usable is shown.

The manipulation controlling unit 101 makes the user ID, the user password, and the usage limitation information correspond to the prescribed user number at step S106 after completion of setting of the user ID, the user password, and the usage limitation information, and makes registration upon storing the information as the user information in the user information storing unit 106. For example, the manipulation controlling unit 101 renders, as shown in the upper table in FIG. 3, the user information on the user having the user ID of "#ab012345" stored in the user information storing unit 106 upon corresponded to the user number of "0000".

Upon completion of the registration of the user information in such a way, the manipulation controlling unit 101 displays a prescribed USB memory registration screen at the displaying unit 112 at step S107. The USB memory registration screen is as shown in, e.g., FIG. 7 constituted of such as a message for asking the USB memory as the registration target to connect to the multifunction peripheral 100. The manipulation controlling unit 101 at step S108 enters in a state waiting for connection of the USB memory 200 to the multifunction peripheral 100 upon displaying such a USB memory registration screen at the displaying unit 112.

The manipulation controlling unit 101 shifts the processing to step S109 in a case where it is detected that the USB memory 200 is connected to the USB interface unit 105, and makes a request to the PnPID retrieving unit 108 so as to retrieve the PnPID of the connected USB memory 200. The PnPID retrieving unit 108 according to this operation retrieves from the PnPID storing unit 202 the PnPID of the connected USB memory 200.

The PnPID retrieving unit 108 looks the active memory information storing unit 109 at step 110, and judges as to whether the retrieved PnPID is already registered or not. The manipulation controlling unit 101 at step S107 displays a USB memory registration screen showing a message or the like prompting exchange of the USB memory at the displaying unit 112 in a case where the retrieved PnPID is already registered as a result of the judgment done by the PnPID retrieving unit 108. To the contrary, the PnPID retrieving unit 108 at step S111 makes corresponding with the PnPID the user number corresponding to the user ID to be recorded and makes registration as the active memory information in a case where the retrieved PnPID is not already registered or namely where the connected USB memory 200 is a new one, and completes a series of registration processings. With this processing, as previously shown in, e.g., the lower table in FIG. 3, the USB memory 200 usable for the user having the user ID of "ab01235" is only the USB memory having the PnPID of "ABCD111100FF".

The manipulation controlling unit 101 shifts the processings to step S112 in a case where it is not detected that the USB memory 200 is connected to the USB interface unit 105, and judges as to whether the stop button 118 is pushed down by the apparatus manager. That is, the manipulation controlling unit 101 judges as to whether a manipulation to interrupt the registration of the USB memory 200 is made or not.

The manipulation controlling unit 101 repeats processings subsequent to step S108 where the stop button 118 is not pushed down. Where the stop button 118 is pushed down, the manipulation controlling unit 101 makes the user number corresponding to the user ID to be registered, corresponding to "NULL" which indicates that the USB memory is not yet registered, as in a situation of the user number of "0001" in, e.g., the lower table in FIG. 3 previously shown, thereby making registration upon stored in the active memory information storing unit 109 as the active memory information, and completing a series of registration processings.

Figure 8:
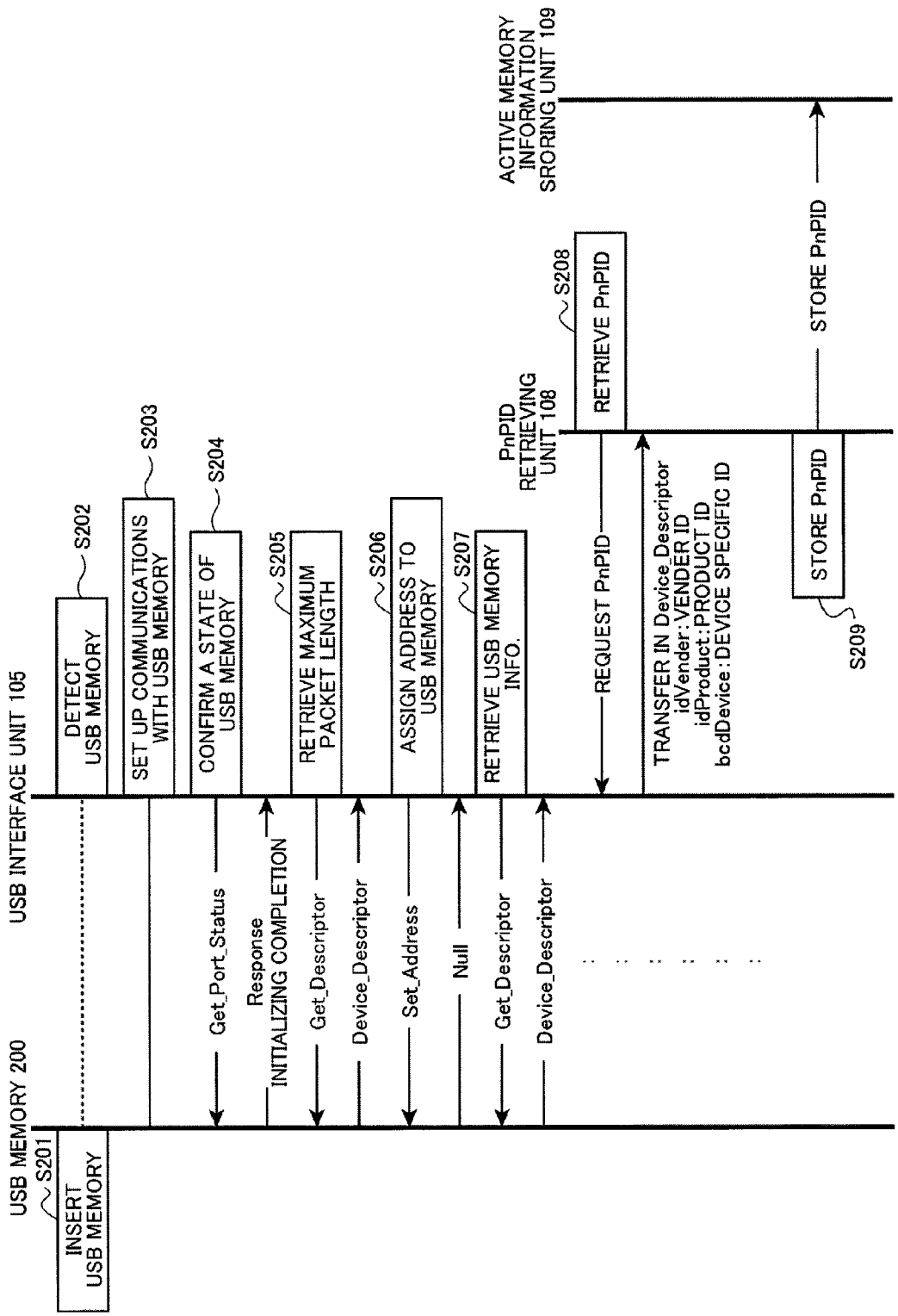
FIG. 8 is a diagram showing a command sequence performed between the multifunction peripheral shown in FIG. 1 and the USB memory when the multifunction peripheral retrieves PnPID of the USB memory to store PnPID in active memory information storing unit.

The multifunction peripheral 100 can register the user information and the connectable USB memories 200 upon performing such a series of registration processings. It is to be noted that in the processings from step S108 to step S111 as described above, the processing in which the multifunction peripheral 100 retrieves the PnPID of the USB memory 200 and stores the PnPID in the active memory information storing unit 109 is done with a command sequence as shown in FIG. 8. A command sequence in complying with a specification of USB version 2.0 is described herein.

As shown in FIG. 8, when the USB memory 200 is connected to the multifunction peripheral 100 at step S201, the USB interface unit 105 detects the connected USB memory 200 at step S202. The USB interface unit 105 sets up a channel for communications with the detected USB memory 200 at step S203, confirms the status of the USB memory 200 at step S204, and waits for completion of initialization of the USB memory 200. It is to be noted that the confirmation of the status of the USB memory 200 is done by the USB interface unit 105 transmitting a Get_Port_Status request to the USB memory 200 and by the USB memory 200 transmitting its response to the USB interface unit 105.

The USB interface unit 105 subsequently transmits a Get_Descriptor request to the USB memory 200 to retrieve the maximum packet length of the USB memory 200 at step S205 and retrieves the device descriptor of the USB memory 200. The device descriptor is, as shown in FIG. 9, data set forth in a hierarchical way in a table format as to what specification the USB device has, and includes the vender ID constituting PnPID, the product ID and the device specific ID. Accordingly the USB memory 200 stores the device descriptor in the PnPID storing unit 202, and the USB interface unit 105 retrieves the device descriptor from the PnPID storing unit 202.

The USB interface unit 105 at step S206 transmits Set_Address request to the USB memory 200 to assign the addresses on the USB bus to the USB memory 200.

The USB interface unit 105 at step S207 transmits Get_Descriptor request to the USB memory 200 to retrieve the PnPID of the USB memory 200, thereby retrieving the device descriptor of the USB memory 200. More specifically, the USB interface unit 105 retrieves, as the PnPID, information of two bites each stored in the idVender field, the idProduct field, and the bcdDevice field as shown in FIG. 9. For example, where the PnPID of the USB memory 200 is "ABCD111100FF", the USB interface unit 105 retrieves hexadecimal number information of "ABCD" stored in the idVender field, hexadecimal number information of "1111" stored in the idProduct field, and hexadecimal number information of "00FF" stored in the bcdDevice field.

When the USB interface unit 105 retrieves the PnPID from the USB memory 200 in a way thus described, the PnPID retrieving unit 108 retrieves the PnPID transferred from the USB interface unit 105 at step S208. The PnPID retrieving unit 108 renders the active memory information storing unit 109 store the retrieved PnPID at step S209.

The multifunction peripheral 100 retrieves the PnPID from the USB memory 200 according to the command sequence and stores the PnPID in the active memory information storing unit 109.

The multifunction peripheral 100 can write to the USB memory 200 the image data read with the reading unit 102 where the user information and the connectable USB memory 200 are registered in the above described manner. More specifically, the multifunction peripheral 100 performs a series of processings as shown in FIG. 10 for image data writing processing.

Figure 10:
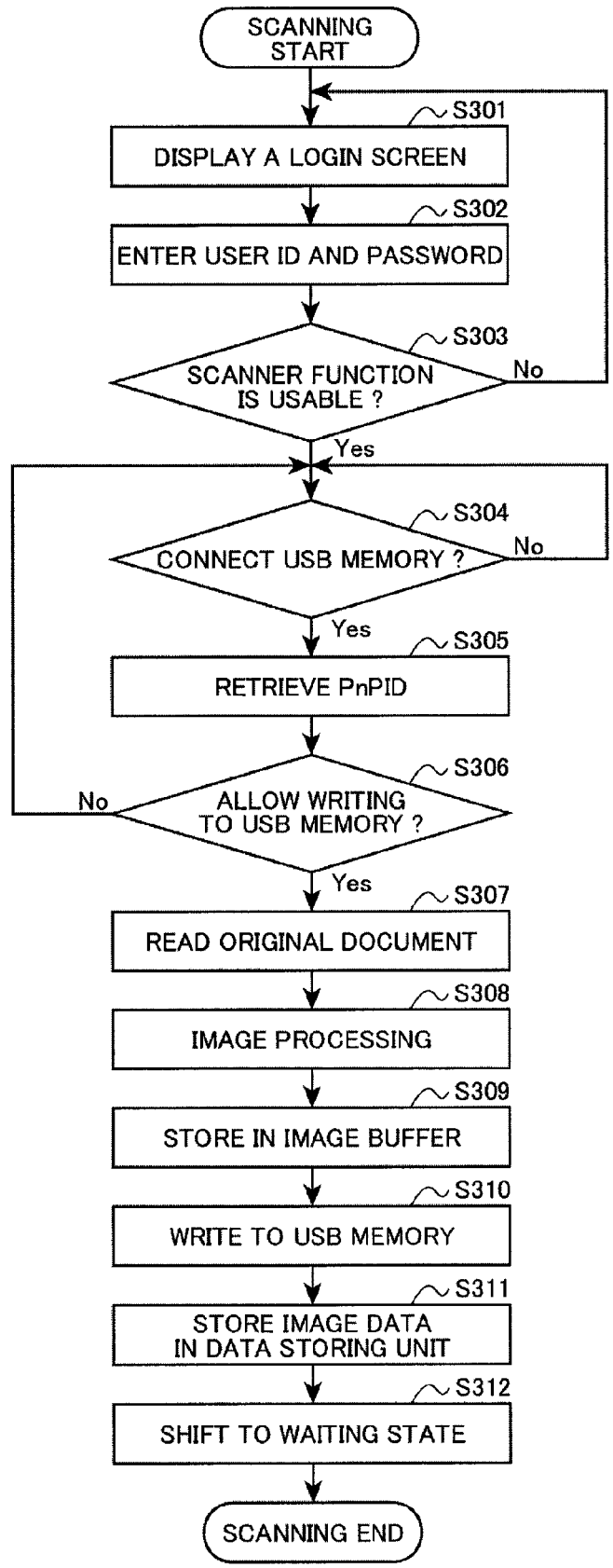
FIG. 10 is a flowchart showing a series of image data writing processing at a time when image data read with a reading unit are written to the USB memory in the image processing system shown as the first embodiment of the invention.
Figure 11:
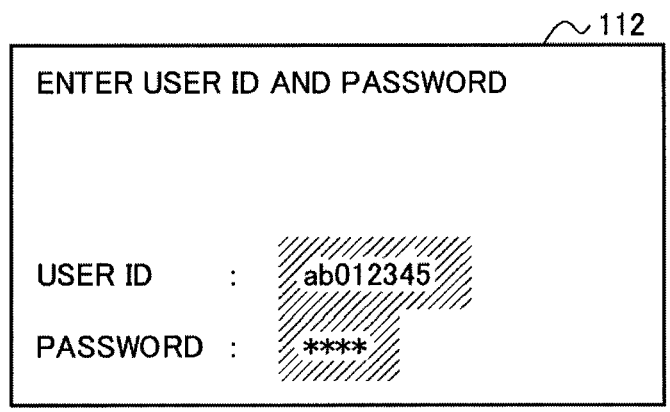
FIG. 11 is a diagram showing a specific example of a login screen displayed at a displaying unit incorporated in the multifunction peripheral shown in FIG. 1.

First, the manipulation controlling unit 101 at step 301 displays a prescribed login screen at the displaying unit 112 as shown in FIG. 10. The login screen is structured to be able to enter the user ID and user password as shown in, e.g., FIG. 11.

The manipulation controlling unit 101 accepts at step 302 the entered user ID and user password according to entries of the user ID and user password using the ten keys 113 or the like by the user into the entry box of the login screen and according to pushing down of the enter key 115. It is to be noted that in FIG. 11, it is shown that the user having the user ID of "ab012345" makes the login.

If the user judging unit 107 judges that the user who performed the login manipulation is one of the registered users, the user judging unit 107 looks up the user information storing unit 106 at step S303 to judge as to whether this user can use the scanner function. For example, the user judging unit 107, as shown previously in the upper table in FIG. 3, judges the user can use the scanner function if the user having the user ID of "ab012345" made the login, and judges the user cannot use the scanner function if the user having the user ID of "ab234567" made the login. The multifunction peripheral 100 repeats the processings from step S301 if the user is judged as cannot use the scanner function, and conversely, shifts the processings to step S304 to enter into a waiting state for connection of the USB memory 200 to the multifunction peripheral 100 if the user is judged as can use the scanner function.

If it is detected that the USB memory 200 is connected to the USB interface unit 105, the manipulation controlling unit 101 at step S305 requests to the PnPID retrieving unit 108 so as to retrieve the PnPID of the connected USB memory 200. The PnPID retrieving unit 108 according to this operation retrieves the PnPID from the PnPID storing unit 202 of the connected USB memory 200. This retrieval of the PnPID is done according to the command sequence as shown in FIG. 8 previously.

The memory use judging unit 110 looks up the active memory information storing unit 109 at step S306, compares the PnPID in the active memory information corresponding to the user number of the login user with the PnPID retrieved by the PnPID retrieving unit 108, and judges as to whether writing use of the data is allowed to the connected USB memory 200. More specifically, the memory use judging unit 110 allows writing use of the data to the USB memory 200 only where the PnPID of the active memory corresponding to the user number of the login user coincides to the PnPID retrieved by the PnPID retrieving unit 108.

If it is judged that writing use of the data to the USB memory 200 is not allowed, the multifunction peripheral 100 prohibits data writing to the USB memory 200, displays at the displaying unit 112 a prescribed screen setting forth a message or the like prompting exchange of the USB memory, and enters in a state waiting for connection of the USB memory 200 at step S304. For example, as shown in the lower table in FIG. 3, because the USB memory 200 that the user having the user ID of "ab012345" can use is only the USB memory having the PnPID of "ABCD111100FF", the multifunction peripheral 100 prohibits data writing to a USB memory 200 where the USB memory 200 having a PnPID different from the above PnPID is connected.

On the other hand, the multifunction peripheral 100 shifts the processings to step S307 where it is judged as writing use of the data to the USB memory 200 is allowed. That is, the reading unit 102 begins reading of the original documents at step S307 and supplies the produced image data to the image processing unit 103. The image processing unit 103 makes a prescribed processing on the image data at step S308 and temporarily stores the data in the image buffer 104 at step S309.

The data writing controlling unit 111 at step S310 transfers the image data read out of the image buffer 104 to the USB interface unit 105, and renders the image data written in the USB memory 200.

The USB memory 200 stores the image data received via the USB interface unit 105 in the data storing unit 203 at step S311 according to the above operation. The multifunction peripheral 100 makes a transition to the waiting state at step S312 when writing the image data to the USB memory 200 is completed, and ends a series of image data writing processings.

The multifunction peripheral 100 can write to the USB memory 200 the image data read by the reading unit 102 in association with performing such a series of image data writing processings, only where the relation between the user and the USB memory 200 coincides to the registered contents As described above, with the image processing system shown as the first embodiment of the invention, the USB memory 200 connectable to the multifunction peripheral 100 is limited to those registered with respect to the respect users, and the functions that respective users can utilize are also registered. Accordingly, multifunction peripheral 100 creates a situation that no secret information can be taken out freely and manages easily such secret information, because of limiting the USB memories 200 usable by the users and limiting the functions usable of the users, so that the multifunction peripheral 100 surely manages information.

Second Embodiment

Next, a multifunction peripheral is described as the second embodiment. The multifunction peripheral is what is modified from the multifunction peripheral shown as the first embodiment, and allows automatic production of user passwords. In this description of the second embodiment, a detailed description is omitted since substantially the same structure elements as those in the first embodiment are assigned with the same reference numbers.

Figure 12:
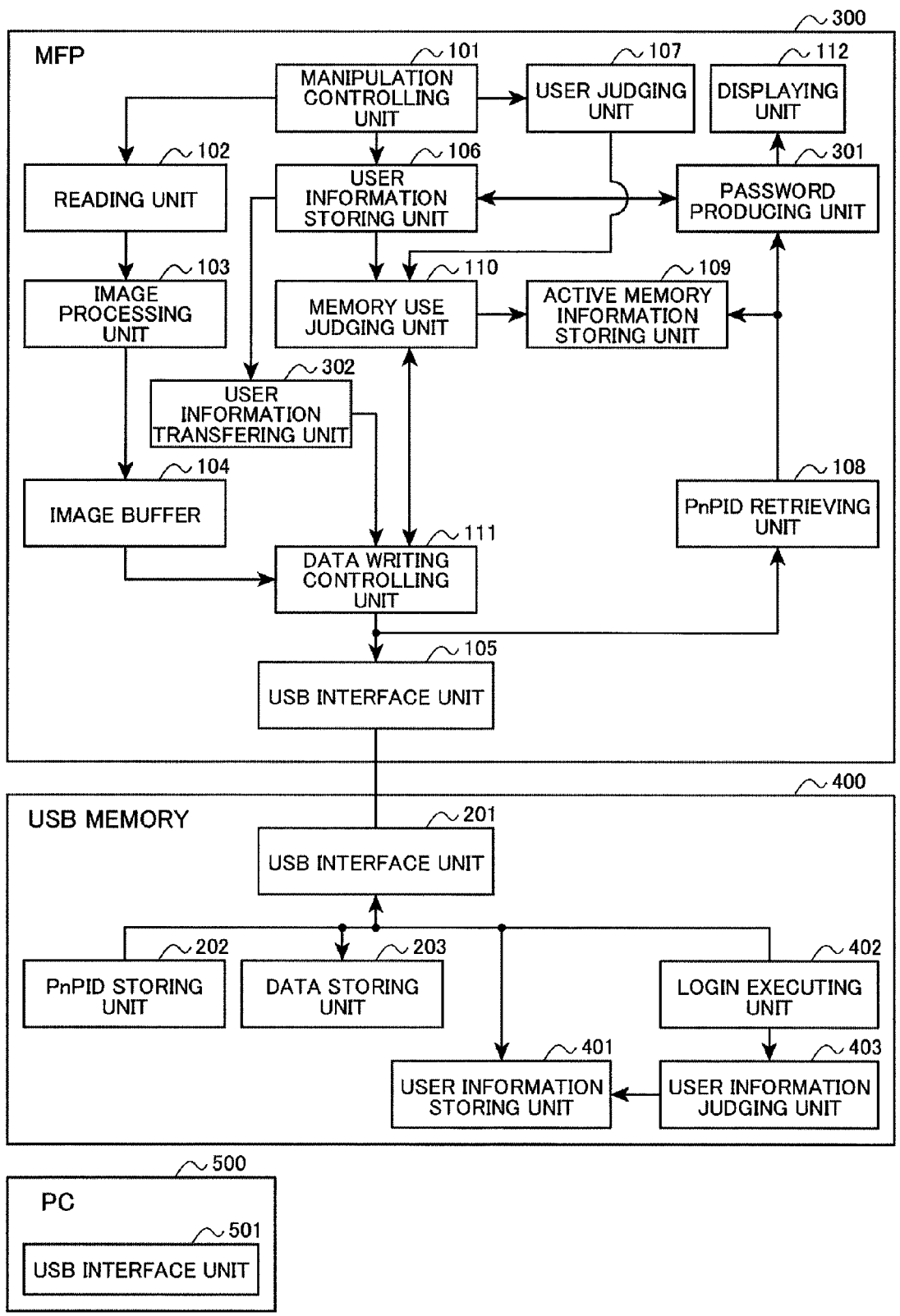
FIG. 12 is a block diagram showing a structure of an image processing system according to a second embodiment of the invention.

As shown in FIG. 12, the multifunction peripheral 300 includes a password producing unit 301 producing user passwords, and a user information transferring unit 302 serving as an information transferring unit for transferring user information of the owner of the USB memory 400 to the USB memory 400, in addition to, as described above, the manipulation controlling unit 101, the reading unit 102, the image processing unit 103, the image buffer 104, the USB interface unit 105, the user information storing unit 106, the user judging unit 107, the PnPID retrieving unit 108, the active memory information storing unit 109, the memory use judging unit 110, and the data writing controlling unit 111. Is to be noted that the displaying unit 112 in FIG. 12 is illustrated apparently as displaying a password produced by the password producing unit 301, and the structure and functions are substantially the same as those in the first embodiment.

The password producing unit 301 automatically produces a user password based on a user ID read out of the user information storing unit 106 and on the PnPID of the USB memory 400 connected to the multifunction peripheral 300 supplied from the PnPID retrieving unit 108. The password producing unit 301 supplies the produced password to the manipulation controlling unit 101. The manipulation controlling unit 101, according to this operation, displays the user password at the displaying unit 112 to inform the user of the password, and makes the produced user password corresponding to the user ID to store the password as the user information in the user information storing unit 106.

The user information transferring unit 302 transfers the user ID and password of the owner of the USB memory 400 to the USB memory 400. That is, the user information transferring unit 302 reads out the user ID stored in the user information storing unit 106 and the user password stored in the user information storing unit 106 produced by the password producing unit 301, and transfers the user ID and password to the USB interface unit 105 to write in the USB memory 400.

The multifunction peripheral 300 thus formed makes registration of the connectable USB memories 400 with respect to the users, in substantially the same way as the multifunction peripheral 100, makes registration of the usable functions with respect to the users, and performs writing of the image data to the USB memory 400 in a case where the use fits to the registered contents. At that time, multifunction peripheral 300 produces automatically the user password based on the PnPID of the connected USB memory 400, and judges the login authority of the user based on the user password.

On the other hand, the USB memory 400 connected to the multifunction peripheral 300, as shown in FIG. 12, includes a user information storing unit 401 for storing the use information transferred from the multifunction peripheral 300, a login executing unit 403 for executing a login processing for the user when the USB memory 400 is connected to a personal computer 500 as an external information processing terminal apparatus, and a user information judging unit 403 for judging the user information of the user manipulating the personal computer 500, in addition to, as described above, the USB interface unit 201, the PnPID storing unit 202, and the data storing unit 203.

The user information storing unit 401 is made of non-volatile memories such as e.g., flash memories or EEPROMs, and stores the user information when receiving via the USB interface unit 201 the user information including the user ID and password transferred from the user information transferring unit 302 of the multifunction peripheral 300. The user information stored in the user information storing unit 401 is read out by the user information judging unit 403.

The login executing unit 402 begins to operate when the USB memory 400 is connected to the USB interface unit 501 of the personal computer 500, and displays a prescribed login screen at the displaying unit of the personal computer 500. The login executing unit 402 executes the login processing of the user who manipulates the personal computer 500 upon receiving the login information in accordance with the user's entry of the login information in use of the personal computer 500. The login executing unit 402 supplies the received login information to the user information judging unit 403, and judges the login authority of the user.

The user information judging unit 403 judges the login authority of the user based on the login information entered via the login screen displayed at the displaying unit of the personal computer 500 upon the login executing unit 402 executing the login processing when the USB memory 400 is connected to the USB interface unit 501 of the personal computer 500 and based on the user information read out of the user information storing unit 401. The user information judging unit 403 allows an access from the personal computer 500 to the USB memory 400 only where the entered login information coincides to the user information read out of the user information storing unit 401.

The USB memory 400 thus formed is connected to the multifunction peripheral 300 in substantially the same manner as the USB memory 200 upon registration to the multifunction peripheral 300 with respect to the usable users. The USB memory 400 judges the login authority of the user manipulating the personal computer 500 when connected to the personal computer 500 and limits access of the users.

Figure 13:
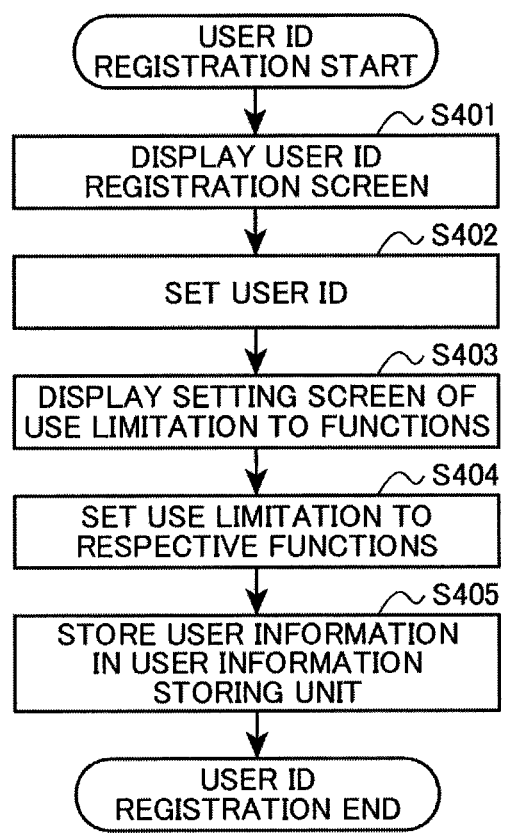
FIG. 13 is a flowchart showing a series of registration processings at a time when user identification in the user information and use limitation information on multifunction peripheral's functions are registered in the multifunction peripheral in the image processing system according to the second embodiment of the invention.
Figure 14:
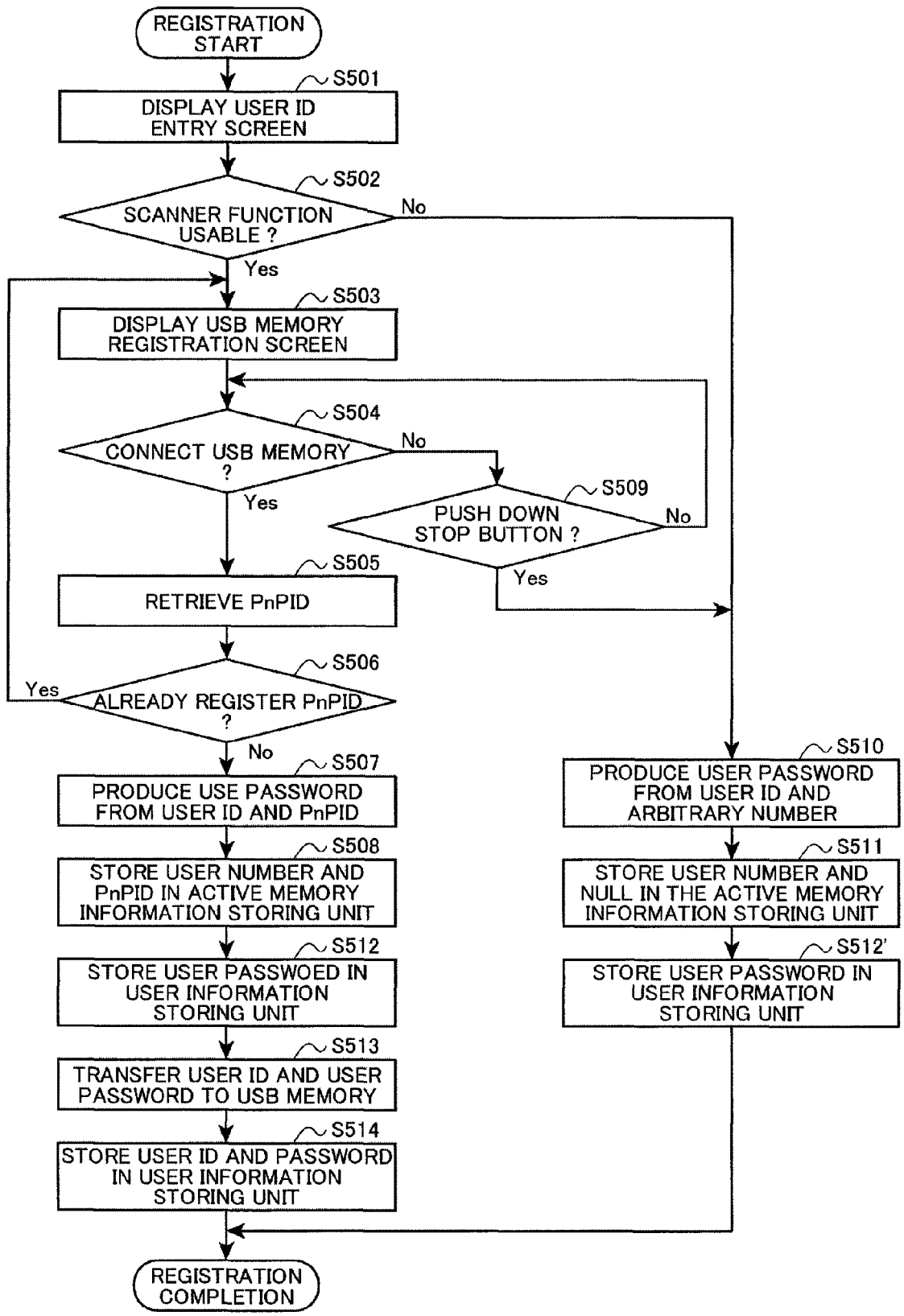
FIG. 14 is a flowchart showing a series of registration processings at a time when user password in the user information and a connectable USB memory are registered in the multifunction peripheral in the image processing system according to the second embodiment of the invention.
Figure 15:
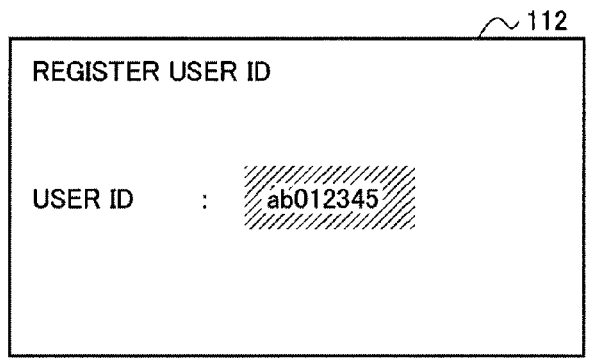
FIG. 15 is a diagram showing a specific example of a user information registration screen displayed at a displaying unit incorporated in the multifunction peripheral shown in FIG. 12.

With the multifunction peripheral 300 thus structured to which the USB memory 400 is connectable, the user information and the connectable USB memories are required to be registered in advance with respect to the users. More specifically, the multifunction peripheral 300 performs a series of processings as shown in FIGS. 13, 14 as a registration processing. In the following description, the apparatus manager of the multifunction peripheral 300 makes registration of the user ID in the user information and the use limitation information of functions given to the multifunction peripheral 300, and the respective users make registration of the user password in the user information and the USB memory 400.

Referring to FIG. 13, a registration processing of the user ID in the user information and the use limitation information of functions given to the multifunction peripheral 300, in the multifunction peripheral 300, is described.

As shown in FIG. 13, the manipulation controlling unit 101 displays a function use limitation information setting screen as shown in FIG. 6 at the displaying unit 112 at step S403. With the manipulation controlling unit 101, the apparatus manager selectively designates either active or inactive operation using the cursor keys 114 or the like on the function usage limitation information setting screen thus formed, and sets allowance or not allowance of usage of the respective functions at step S404 according to pushing down of the enter key 115.

The manipulation controlling unit 101 makes the user ID and the usage limitation information correspond to the prescribed user number at step S405 after completion of setting of the user ID and the usage limitation information, and makes registration upon storing the information as the user information in the user information storing unit 106. For example, the manipulation controlling unit 101 renders, as previously shown in the upper table in FIG. 3, the user ID and use limitation information on the user having the user ID of "#ab012345" stored in the user information storing unit 106 upon corresponded to the user number of "0000". The multifunction peripheral 300 shifts to a waiting state upon completion of storing the user ID and use limitation information and ends a series of registration processings.

The multifunction peripheral 300 can register the user ID and use limitation information of functions by doing such a series of registration processings.

The multifunction peripheral 300, can register the user ID and use limitation information of functions by doing such a series of registration processings. The multifunction peripheral 300 makes registration processing of the user password as the user information and the USB memory 400 according to the manipulation by the respective users upon completion of registrations of the user IDs and use limitation information in such a manner described above.

Figure 16:
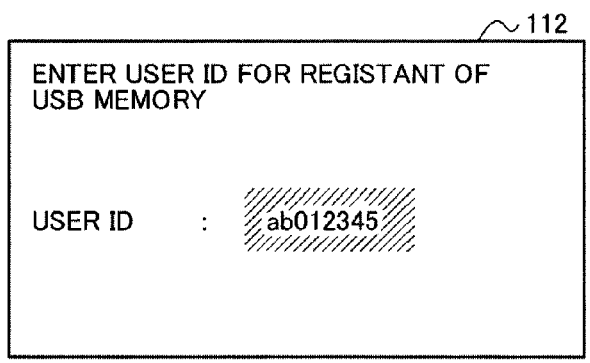
FIG. 16 is a diagram showing a specific example of a user identification entry screen displayed at a displaying unit incorporated in the multifunction peripheral shown in FIG. 12.

The manipulation controlling unit 101 displays a prescribed user ID entry screen at the displaying unit 112 at step S501 as shown in FIG. 14. The user ID entry screen is structured to allow the user ID to enter as shown in, e.g., FIG. 16. The manipulation controlling unit 101 enters the user ID in an entry box on the user ID entry screen using the ten keys 113 or the like by the user and accepts the entered user ID according to pushing down operation of the enter key 115. It is to be noted that in FIG. 16, it is shown that a user having the user ID of "ab012345" enters the user ID.

If the user judging unit 107 judges that the user who enters the user ID is one of the registered users, the user judging unit 107 judges at step S502 whether the user can use the scanner function or not upon referring to the user information storing unit 106. For example, the user judging unit 107 judges that the user can use the scanner function in a case where the user having the user ID of "ab012345" makes a login as shown in the upper table in FIG. 3 previously, and judges that the user cannot use the scanner function in a case where the user having the user ID of "ab234567" makes a login.

The multifunction peripheral 300 shifts the processings to step S510 in a case where the user cannot use the scanner function. On the other hand, the multifunction peripheral 300 makes a transition to step S503 in a case where the user can use the scanner function. The manipulation controlling unit 101 displays the USB memory registration screen as shown in FIG. 7 previously at the displaying unit 112 at step S503. The manipulation controlling unit 101 enters into a waiting state for the USB memory 400 to the multifunction peripheral 300 at step S504 upon displaying such the USB memory registration screen at the displaying unit 112.

The manipulation controlling unit 101 makes a transition to step S509 and judges as to whether the user pushes down the stop button 118 in a case where it is not yet detected that the USB memory 400 is connected to the USB interface unit 105. That is, the manipulation controlling unit 101 judges as to whether the use manipulates to stop the registration manipulation for the USB memory 400.

The manipulation controlling unit 101 repeats processings from step S504 in a case where the stop button 118 is not pushed down, and conversely, makes a transition to step S510 in a case where the stop button 118 is pushed down.

The manipulation controlling unit 101 makes a transition to step S505 in a case where it is detected at step S504 that the USB memory 400 is connected to the USB interface unit 105, and makes a request to the PnPID retrieving unit 108 as to retrieve the PnPID of the connected USB memory 400. The PnPID retrieving unit 108 retrieves the PnPID from the PnPID storing unit 202 in the connected USB memory 400 according to this operation. It is to be noted that retrieval of the PnPID is done according to the command sequence as previously shown in FIG. 8.

The PnPID retrieving unit 108 looks up the active memory information storing unit 109 at step S506 and judges as to whether the retrieved PnPID is already registered. The manipulation controlling unit 101 at step S503 displays a USB memory registration screen indicating a message or the like prompting exchange of the USB memory at the displaying unit 112 in a case where the retrieved PnPID is already registered as a result of judgment done by the PnPID retrieving unit 108. To the contrary, if the retrieved PnPID is not already registered, or namely if the connected USB memory 400 is a new one, the password producing unit 301 produces a password at step S507 based on the entered user ID at step S501 and the PnPID retrieved at step S505. More specifically, the password producing unit 301 produces a user password using the character strings of lower three digits of the user ID and the character strings of lower three digits of the PnPID. For example, the password producing unit 301 produces a user password of "3450FF" where the user ID is "ab012345" while the PnPID is "ABCD111100FF". The manipulation controlling unit 101 displays a user password informing screen as shown in, e.g., FIG. 17 at the displaying unit 112 where the password producing unit 301 produces the user password and informs the user. With this operation, the user can know the his own password for accessing the USB memory 400.

Where the user password is thus produced, the PnPID retrieving unit 108 renders the user number corresponding to the user ID to be registered and the PnPID, corresponding to each other to be stored in the active memory information storing unit 109 as the active memory information, and makes a transition to processings at step S512. With this operation, the USB memory 400 that the user having the user ID of "ab012345" as shown in the lower table in FIG. 3 can use is only the USB memory having the PnPID of "ABCD111100FF".

The manipulation controlling unit 101 makes the produced user password, as the user information, corresponding to the user ID previously stored in the user information storing unit 106 and the use limitation information, and stored the produced user password in the user information storing unit 106 to register the user password.

Where the manipulation controlling unit 101 detects at step S504 that the USB memory 400 is connected to the USB interface unit 105, the user information transferring unit 302 at step S513 reads out the user ID and user password form the user information storing unit 106, and transfers the user ID and the user password to the USB memory 400. The USB memory 400 according to this operation stores the user ID and the user password received via the USB interface unit 201 in the user information storing unit 401 at step S514. The multifunction peripheral 300 makes a transition to a waiting state upon completion of writing the user ID and the user password to the USB memory 400, and ends a series of registration processings.

Figure 17:
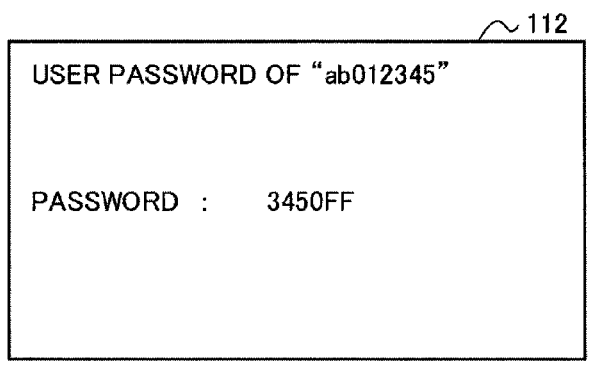
FIG. 17 is a diagram showing a specific example of a user password notice screen displayed at a displaying unit incorporated in the multifunction peripheral shown in FIG. 12.

The multifunction peripheral 300 shifts the processing to step S510 in a case where it is judged at step S502 as that the user cannot use the scanner function, or where the stop button 118 is pushed down at step S509. The password producing unit 301 produces a user password at step S510 based on the user ID entered at step S501 and on an arbitrary character strings. More specifically, the password producing unit 301 produces the user password using the character strings of lower three digits of the user ID and the character strings of arbitrary three digits. For example, if the password producing unit 301 produces a user password of "45605B" or the like where the user ID is "ab123456". The manipulation controlling unit 101 displays a user password informing screen as shown in FIG. 17 previously at the displaying unit 112 when the password producing unit 301 produces the user password to inform the password to the user. With this operation the user can know his password to access the USB memory 400.

Where the user password is thus produced, the manipulation controlling unit 101 at step S511 makes the user number corresponding to the user to be registered as previously shown as the user number "0001" in,e.g., the lower table in FIG. 3 and the word "NULL" indicating that the USB memory is not yet registered, corresponding to each other, makes registrations as active memory information in the active memory information storing unit 109, and shifts the processings to step S512'.

The manipulation controlling unit 101 stores the produced user password as the user information in the user information storing unit 106 at step S512' in corresponding to the user ID and the use limitation information stored in the user information storing unit 106 in advance, to register the user password, and then makes a transition to a waiting state to end a series of the registration processings.

The multifunction peripheral 300 can produce automatically the user passwords by performing such a series of registration processings, and can register the user passwords and connectable USB memories 400. That is, the multifunction peripheral 300 can register the user information including automatically produced passwords and the connectable USB memories 400.

The multifunction peripheral 300 can write the image data by the reading unit 102 to the USB memory 400 by doing a series of image data writing processings as previously shown in FIG. 10, where registering the user information and the connectable USB memories 400 in a manner described above. That is, the multifunction peripheral 300 can write the image data read by the reading unit 102 to the USB memory 400 only where the relation between the user and the USB memory 400 coincides to the registered contents.

Figure 18:
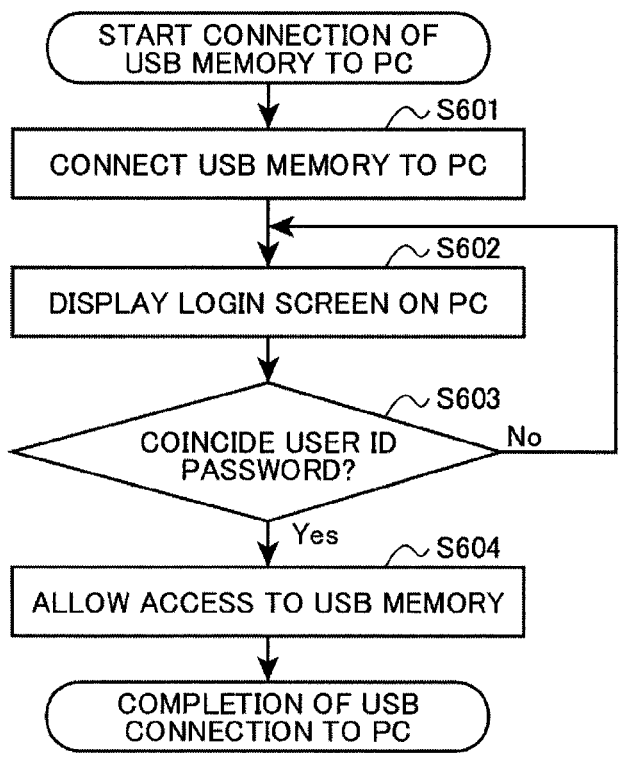
FIG. 18 is a flowchart illustrating a series of processings when the USB memory is connected to a personal computer in the image processing system according to the second embodiment of the invention.

Next, a processing when the USB memory 400 is connected to the personal computer 500 is described in referring to FIG. 18.

Figure 19:
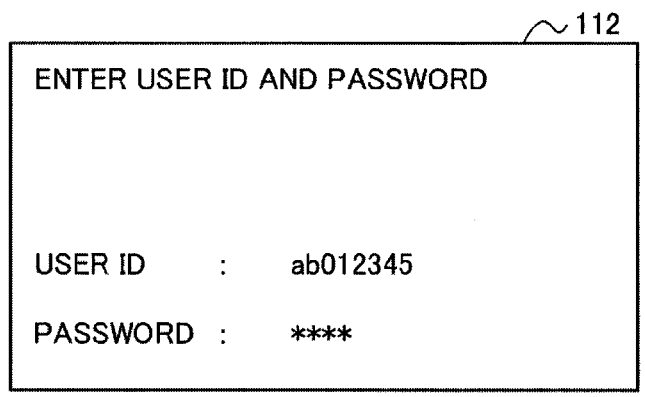
FIG. 19 is a diagram showing a specific example of a login screen displayed at a displaying unit incorporated in the multifunction peripheral shown in FIG. 12.

The USB memory 400 begins to operate the login executing unit 402 at step S601 as shown in FIG. 18 upon connecting to the USB interface unit 501 of the personal computer 500. The login executing unit 402 displays a prescribed login screen at a displaying unit of the personal computer 500 at step S602. The login screen is structured to enter the user ID and user password as shown in, e.g., FIG. 19. The login executing unit 402 accepts the entered user ID and user password in accordance with entry of the user ID and user password using a manipulating unit of the personal computer 500 into an entry box of the login screen. FIG. 19 shows a situation in which a user having the user ID of "ab012345" makes login.

The user information judging unit 403 subsequently judges a login authority of the user who did login manipulation at step S603 based on the entered login information and the user information read out of the user information storing unit 401. More specifically the user information judging unit 403 judges that the user who did the login manipulation is the registered user only where the entered user ID and user password coincide to the user ID and password read out of the user information storing unit 401.

The login executing unit 402 at step S602 displays at the displaying unit of the personal computer 500 a login screen indicating a message or the like showing that an access to the USB memory 400 is not allowed in a case where the user is not the registered user as the result of the judgment made by the user information judging unit 403. Conversely, the login executing unit 402 at step S604 displays at the displaying unit of the personal computer 500 a prescribed screen indicating a message or the like showing that an access to the USB memory 400 is allowed in a case where the user is the registered user, thereby allowing an access to the USB memory 400 from the personal computer 500, and completing a series of processings. For example, where a user having the user ID of "ab012345" manipulates the personal computer 500 to access the USB memory 400 having the PnPID of "ABCD111100FF", and where a user password of "3450FF" is produced at step S507 in FIG. 14, an access from the personal computer 500 to the USB memory 400 is not allowed unless the user enters "ab012345" as the user ID and "3450FF" as the user password with use of manipulating unit of the personal computer 500.

The USB memory 400 judges the login authority of the user who manipulates the personal computer 500 by doing such a series of processings where connected to the personal computer 500, so that can limit the access.

As described above, with the image processing system according to the second embodiment of the invention, the multifunction peripheral 300, in substantially the same way as the multifunction peripheral 100, can limit the USB memories usable by the users, and can limit the functions usable by the respective users, so that the management of the secret information can be performed easily upon creating a situation that the secret information cannot be taken out freely, and so that information management can surely be made. In addition, the multifunction peripheral 300 can create the user password automatically, thereby reducing loads on user's manipulation for registration. Because the owner of the USB memory 400 only can confirm the user password at a time of the registration, the system can greatly reduce the possibility of divulging the user password to a third party. The USB memory 400 can restrict the access from the personal computer 500, so that security for reading out of the image data can be enhanced, and so that viewing of the image data by a third party other than the owner of the USB memory 400 can be prevented in advance.

This invention is not limited to the above embodiments.

For example, in the above embodiments, it is described in which the USB memory is used as an external memorizing device; the USB interface unit is used as the connecting unit; the PnPID is used as specific identification information for external memorizing device. According to the invention, such as, e.g., a hard disc or memory card can be used as the external memorizing device; communication interface in compliance with the IEEE 1394 or other various network interfaces can used as connecting unit; MAC (Media Access Control) address can be used as identification information specific to the external memorizing device. According to the invention, a non-contacting recording medium such as IC memory card can be used as the external memorizing device; wireless communication interface utilizing RFID (Radio Frequency Identification) can be used as the connecting unit; and ucode (registered trademark of ubiquitous ID center) can be used as identification information specific to the external memorizing device.

In the second embodiment, the password is produced using the character strings of lower three digits of the user ID and the character strings of lower three digits of the PnPID, the user password can be produced in altering the use digits of the character strings. Moreover, in this invention, the user password can be produced by permuting the character strings of the user ID and the character strings of the PnPID according to a prescribed rule, or by doing a prescribed operation processing such as generating a random number using the character strings of the user ID and the character strings of the PnPID as the seed. That is, in this invention, the production method can be any method as far as based on the user information and the PnPID.

In the above embodiments, multifunction peripherals having the copying function, the facsimile function, and the scanner function are described as the image processing apparatus, but this invention is applicable to any apparatus capable of saving the image data to the external memorizing device, and for example, this invention is applicable to, e.g., a photocopier, a facsimile machine, and a scanner.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image processing apparatus to which an external memorizing device for making data writable thereto is detachably attached, the image processing apparatus comprising:

a connection unit configured to connect the external memorizing device in which specific memorizing device identification information is stored;

an identification information retrieving unit configured to retrieve the memorizing device identification information from the external memorizing device connected to the connection unit;

a memorizing device usage allowance information storing unit configured to previously store the memorizing device identification information;

a memorizing device usage judgment unit configured to judge as to whether the external memorizing device connected to the connection unit is usable, based on the memorizing device identification information retrieved out of the external memorizing device connected to the connection unit by the identification information retrieving unit, and on the memorizing device identification information stored in the memorizing device usage allowance information storing unit corresponding to the user information beforehand, where the external memorizing device is connected to the connection unit;

an image data storing unit configured to store the image data;

a data writing controlling unit configured to write the image data stored in the image data storing unit to the external memorizing device storing the memorizing device identification information used in a judgment by the memorizing device usage judgment unit in the case where the memorizing device usage judgment unit judges that the external memorizing device connected to the connection unit is usable, a user information storing unit configured to store user information relating to a user;

wherein the memorizing device usage allowance information storing unit stores the memorizing device identification information upon corresponding beforehand to the user information, a user information entry unit configured to enter the user information; and a user judging unit configured to judge as to whether a use login is acceptable or not based on the user information entered with the user information entry unit and on the user information stored in the user information storing unit, wherein the memorizing device usage judgment unit judges whether or not the external memorizing device connected to the connection unit is usable based on the memorizing device identification information retrieved out of the external memorizing device connected to the connection unit by the identification information retrieving unit and on the memorizing device identification information beforehand stored in the memorizing device usage allowance information storing unit corresponding to the user information of the user whose login has been allowed by the user judging unit, where the external memorizing device is connected to the connection unit and where the user login has been allowed by the user judging unit.

2. The image processing apparatus according to claim 1, further comprising:

a password production unit configured to produce a user password based on the user information stored in the user information storing unit and on the memorizing device identification information retrieved out of the external memorizing device by the identification information retrieving unit; and a controller configured to render the user information storing unit to store the user password produced by the password production unit with respect to the external memorizing device connected to the connection unit.

3. The image processing apparatus according to claim 2, further comprising a displaying unit configured to display the password produced by the password production unit.

4. The image processing apparatus according to claim 2, further comprising an information transmission unit configured to transmit the password produced by the password production unit with respect to the external memorizing device connected to the connection unit and the user information stored in the user information storing unit corresponding to the user password.

5. The image processing apparatus according to claim 2, further comprising:

a manipulation controlling unit configured to first perform a user registration and a function usage limitation setting; and the password production unit is further configured to await a USB attachment and produce a password based on a user ID and USB identification information when a scanning function is usable, and produce a password based on the user ID and on an arbitrary character string when the scanning function is not usable, wherein the manipulation controlling unit is configured to perform a password setting and a USB registration thereafter.

6. The image processing apparatus according to claim 1, further comprising:

a reading unit configured to read an original document; and an image processing unit configured to process electronic data read by the reading unit.

7. The image processing apparatus according to claim 1, wherein the memorizing device usage allowance information storing unit, in a registration mode, stores the memorizing device identification information retrieved out of the external memorizing device connected to the connection unit by the identification information retrieving unit in a case where the external memorizing device is connected to the connection unit to register the memorizing device identification information.

8. An image processing system having an external memorizing device for making data writable thereto and an image processing apparatus detachably attaching the external memory device, the image processing system comprising:

the external memorizing device including:

an identification information storing unit configured to store specific memorizing device identification information; and a data storing unit configured to store data received from the image processing apparatus;

the image processing apparatus including:

a connection unit configured to connect the external memorizing device;

an identification information retrieving unit configured to retrieve the memorizing device identification information from the external storage connected to the connection unit;

a memorizing device usage allowance information storing unit configured to previously store the memorizing device identification information;

a memorizing device usage judgment unit configured to judge as to whether the external memorizing device connected to the connection unit is usable, based on the memorizing device identification information retrieved out of the external memorizing device connected to the connection unit by the identification information retrieving unit and on the memorizing device identification information stored in the memorizing device usage allowance information storing unit corresponding to the user information beforehand, where the external memorizing device is connected to the connection unit;

an image data storing unit configured to store the image data; and a data writing controlling unit configured to write the image data stored in the image data storing unit to the external memorizing device storing the memorizing device identification information used in a judgment by the memorizing device usage judgment unit, where the memorizing device usage judgment unit judges as that the external memorizing device connected to the connection unit is usable, and a user information storing unit configured to store user information relating to a user;

wherein the memorizing device usage allowance information storing unit stores the memorizing device identification information upon corresponding beforehand to the user information, a user information entry unit configured to enter the user information; and a user judging unit configured to judge as to whether a user login is acceptable or not based on the user information entered with the user information entry unit and on the user information stored in the user information storing unit;

wherein the memorizing device usage judgment unit judges as to whether or not the external memorizing device connected to the connection unit is usable based on the memorizing device identification information retrieved out of the external memorizing device connected to the connection unit by the identification information retrieving unit and on the memorizing device identification information beforehand stored in the memorizing device usage allowance information storing unit corresponding to the user information of the user whose login has been allowed by the user judging unit, where the external memorizing device is connected to the connection unit and where the user login has been allowed by the user judging unit.

9. The image processing system according to claim 8, wherein the image processing apparatus includes an information transmission unit configured to transfer to the external memorizing device connected to the connection unit the user password and the user information stored in the user information storing unit corresponding to the user password to be written in the external memorizing device, and wherein the external memorizing device includes the user information storing unit configured to store the user password and the user information transmitted to the information transmission unit by the information transmission unit, and a login executing unit configured to execute a login processing operation, in a case where an arbitrary information processing terminal is connected to the image processing system, in accompany with judgment as to allow the information processing terminal to access to the external memorizing device based on login information entered via the image processing terminal and the user information read out of the user information storing unit.

10. The image processing system according to claim 8, wherein the image processing apparatus comprising:

a user information entry unit configured to enter the user information; and a user judging unit configured to judge as to whether a function in the image processing apparatus is usable based on the user information entered with the user information entry unit and the user information stored beforehand in the user information storing unit.

11. The image processing system according to claim 8, wherein the memorizing device usage allowance information storing unit, in a registration mode, stores the memorizing device identification information retrieved out of the external memorizing device connected to the connection unit by the identification information retrieving unit in a case where the external memorizing device is connected to the connection unit to register the memorizing device identification information.

* * * * *